(12) United States Patent
Shin et al.

(10) Patent No.: US 7,933,271 B2
(45) Date of Patent: Apr. 26, 2011

(54) MAC FORWARDING METHOD FOR MULTI-HOP ROUTING IN COMMUNICATION SYSTEM BETWEEN VEHICLES

(75) Inventors: Chang-Sub Shin, Daejon (KR); Hyun Lee, Daejon (KR); Han-Byeog Cho, Daejon (KR); Hyuk-Joon Lee, Seoul (KR); Cheol-Sig Pyo, Daejon (KR); Jong-Suk Chae, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 549 days.

(21) Appl. No.: 11/487,534

(22) Filed: Jul. 13, 2006

(65) Prior Publication Data

US 2007/0110067 A1 May 17, 2007

(30) Foreign Application Priority Data

Nov. 18, 2005 (KR) .................. 10-2005-0110918
Jan. 6, 2006 (KR) .................. 10-2006-0001955

(51) Int. Cl.
*H04L 12/28* (2006.01)
*H04B 7/00* (2006.01)
*H04Q 7/00* (2006.01)
*H04Q 7/20* (2006.01)

(52) U.S. Cl. ........ 370/392; 370/310; 370/331; 370/351; 455/436; 455/442; 455/443

(58) Field of Classification Search .................. None
See application file for complete search history.

(56) References Cited

FOREIGN PATENT DOCUMENTS

| KR | 10-2004-0050425 | 6/2004 |
|---|---|---|
| KR | 10200500832428 A | 8/2005 |
| WO | WO 02/35779 A2 | 5/2002 |
| WO | WO 2004/059928 A1 | 7/2004 |

OTHER PUBLICATIONS

"Universal Mobile Telecommunications System", http://en.wikipedia.org/wiki/Universal_Mobile_Telecommunications_System, Oct. 23, 2009.*
Wooshin Lee et al., "A Contention-based Multi-hop MAC Forwarding Protocol", 2005 Autumn Scientific Speech for Paper Abstract Collection, vol. 32, Nov. 19, 2005, Korean Institute of Communicationn and Sciences, Summary (1 page), Contents (1 page), Article in Korean, pages: cover sheet, p. 31, and pp. viii-xxi.
Submitted by Hanbyeog Cho, Etri, on behalf of the ISO/TC204 Korea Committee, "A Contribution on Inter Vehicle Communication—Dedicated for MAC Protocol", Aug. 1, 2005, pp. 1-13.

(Continued)

*Primary Examiner* — Ayaz R Sheikh
*Assistant Examiner* — Blanche Wong
(74) *Attorney, Agent, or Firm* — Blakely, Sokoloff, Taylor & Zafman LLP

(57) ABSTRACT

Provided is a Media Access Control (MAC) forwarding method for multi-hop routing in a communication system between vehicles. The method includes the steps of: a) receiving a frame from all nodes and checking whether there are duplicate frames; b) partly updating forwarding cache table (FCT) information, or updating SNT information and checking whether a destination address is a corresponding node; c) updating the FCT information, transmitting an Ack signal and transferring the frame to the upper layer, or searching whether the destination address is registered as "d_addr"; d) updating the FCT information and transmitting a delay ACK frame or checking whether the transmitted frame is a flooding frame; and e) updating the FCT information, checking whether the other node does not transmit the "d_ack" and inserting a flooding frame, otherwise, updating the FCT information and abandoning the frame.

4 Claims, 3 Drawing Sheets

OTHER PUBLICATIONS

Charles E. Perkins et al., "Ad-hoc On-Demand Distance Vector Routing", pp. 1-11, (Mobile Computing Systems and Applications, Feb. 1999).

David B. Johnson et al., "Dynamic Source Routing In Ad Hoc Wireless Networks", Mobile Computing, vol. 5, pp. 153-181, 1966.

* cited by examiner

MAC FORWARDING METHOD FOR MULTI-HOP ROUTING IN COMMUNICATION SYSTEM BETWEEN VEHICLES

FIELD OF THE INVENTION

The present invention relates to a Media Access Control (MAC) forwarding method for multi-hop routing in a communication system between vehicles; and, more particularly, to a MAC forwarding method which performs multi-hop routing based on forwarding of an MAC layer in the an Ad-hoc communication system between vehicles, whose vehicle speed and network pattern are frequently changed.

DESCRIPTION OF RELATED ART

A generally known multi-hop routing algorithm includes a routing method based on routing information in a network layer and a flooding method which does not have routing table information. In the flooding method, one packet from one node is transmitted to all other nodes connected to a router. The flooding method distributes the routing information revised in a massive network to all nodes.

The routing method in the network layer maintains a routing table by transmitting and receiving an information packet when the routing is performed among nodes, thereby making the multi-hop routing possible. However, when the routing method is applied to a communication system between vehicles whose vehicle speed and network pattern are frequently changed, there is a problem that it is not easy to maintain a table and overhead is generated a lot.

The flooding method, which does not have routing table information, has a problem that the overhead gets larger when the number of vehicles is large.

Accordingly, the conventional multi-hop routing method cannot be properly applied to the communication system between vehicles and it is required to apply a new multi-hop routing method.

SUMMARY OF THE INVENTION

It is, therefore, an object of the present invention to provide a Media Access Control (MAC) forwarding method for multi-hop routing in a communication system between vehicles, which performs multi-hop routing based on forwarding of a MAC layer in the communication system for Ad-hoc communication between vehicles, whose vehicle speed and network pattern are frequently changed.

Other objects and advantages of the invention will be understood by the following description and become more apparent from the embodiments in accordance with the present invention, which are set forth hereinafter. It will be also apparent that objects and advantages of the invention can be embodied easily by the means defined in claims and combinations thereof.

In accordance with an aspect of the present invention, there is provided a MAC forwarding method for multi-hop routing in a communication system between vehicles, the method including the steps of: a) receiving frames in nodes and checking whether there are duplicate frames; b) at each node partly updating forwarding cache table (FCT) information when there are duplicate frames or updating a sequence number table (SNT) information when there is no duplicate frame and checking whether a destination address is the node's own address; c) when the destination address is the node's own address, updating the FCT information transmitting an Ack signal and transferring the frame to the upper layer, or when the destination address is not the node's own address, searching whether the destination address is registered as "d_addr" in the FCT; d) when the destination address is registered, updating the FCT information and transmitting a delay ACK frame, which is "d_ack", or when the destination address is not registered in the FCT, checking whether the transmitted frame is a flooding frame; and e) updating the FCT information, checking whether there is no other node transmitting the "d_ack" and inserting a flooding frame when the transmitted frame is the flooding frame, otherwise, updating the FCT information and abandoning the frame.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and advantages of the present invention will become apparent from the following description of the embodiments with reference to the accompanying drawings. Therefore, those skilled in the art that the present invention is included can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
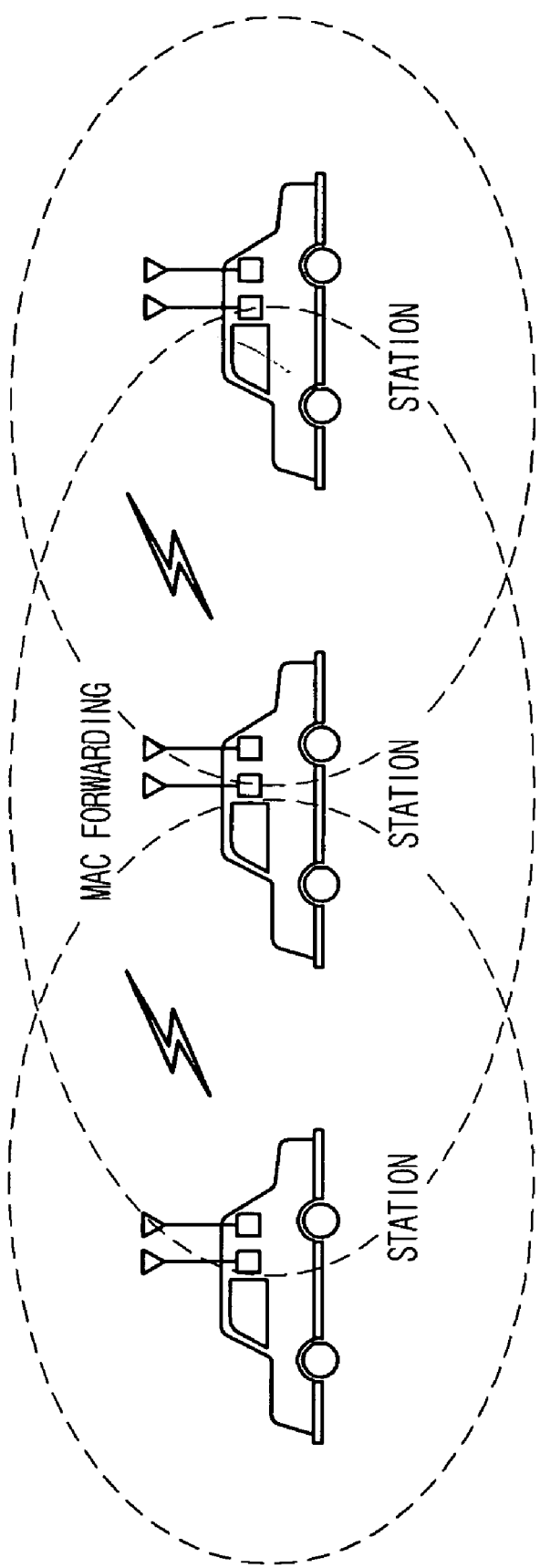
FIG. 1 is a diagram showing a communication system between vehicles to which the present invention is applied.

FIG. 1 is a diagram showing a communication system between vehicles to which the present invention is applied.

As shown in FIG. 1, the communication system between vehicles uses an Ad-hoc communication method for a communication between vehicles whose network pattern is frequently changed, and includes a system capable of multi-hop routing.

The communication system between vehicles are assumed to have the following characteristics.

A single channel is used for communications between vehicles, and the same network identifier (ID), which is pre-defined. Also, all data for the multi-hop should be broadcasting data and 4 Media Access Control (MAC) addresses are used.

In the present invention, a MAC forwarding table is maintained by using 4 address fields of a MAC frame in a MAC layer for multi-hop routing between vehicles in the communication system between vehicles.

While a conventional format should be maintained for compatibility with a conventional IEEE 802.11 MAC frame, a data Type and a Sub-Type are individually defined and used.

A multi-hop routing function is provided by using the MAC forwarding method based on the type of the pre-defined frame.

Figure 2:
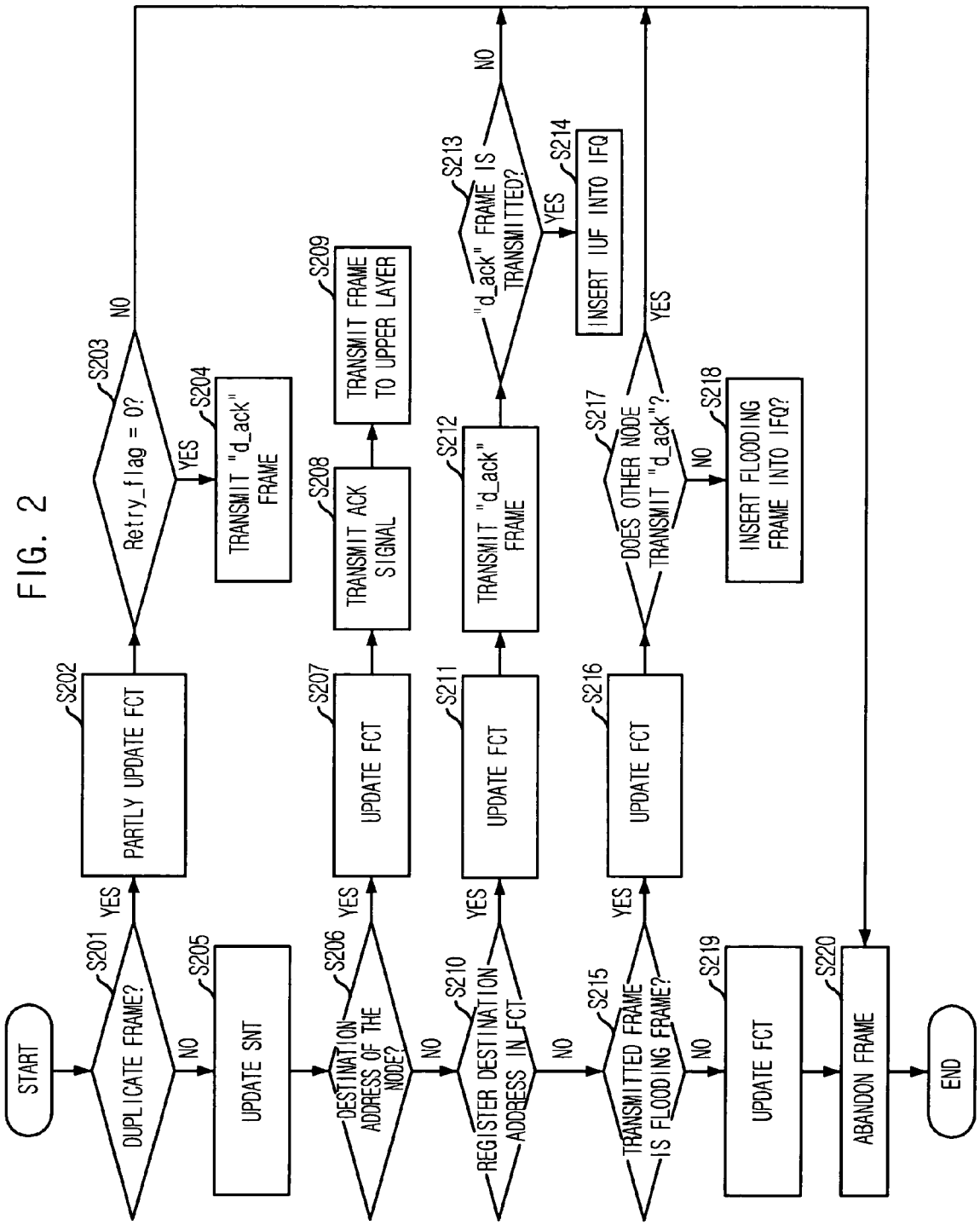
FIG. 2 is a flowchart describing a Media Access Control (MAC) forwarding method for multi-hop routing in a communication system between vehicles in accordance with an embodiment of the present invention.

FIG. 2 is a flowchart describing a MAC forwarding method for multi-hop routing in the communication system between vehicles in accordance with an embodiment of the present invention.

In FIG. 2, "d_addr" is a destination address; "d_ack" is a delay ACK; "Flooding Frame" is a flooding frame; "IUF" is an implicit unicast frame; "FCT" is a forwarding cache table; and "SNT" is a sequence number table (SNT).

As shown in FIG. 2, in the MAC forwarding method for multi-hop routing in the communication system between vehicles of the present invention, every node receives a frame and it is checked at step S201 whether there are duplicate frames.

When it turns out at the step S201 that there are duplicate frames, forwarding cache table (FCT) information is partly updated at step S202. When a value of "Retry_flag" is 0, "d_ack" frame is transmitted at step S204. Otherwise, the frame is abandoned at step S220.

When it turns out at the step S201 that the transmitted frame is not a duplicate frame, SNT information is updated at step S205 and it is checked at step S206 whether the destination address is an address of a corresponding node.

When it turns out at step S206 that the destination address is the address of the corresponding node, FCT information is updated at step S207. Subsequently, an Ack signal is transmitted at step S208 and the frame is transmitted to a layer above the MAC layer at step S209.

When it turns out at step S206 that the destination address is not the address of the corresponding node, it is searched whether the destination address is registered as "d_addr" in the FCT at step S210.

When it turns out at step S210 that the "d_addr" is registered, the FCT information is updated at step S211 and the "d_ack" frame is transmitted at step S212. When the transmission is successful, the implicit unicast frame (IUF) is inserted into an interface queue (IFQ) at step S214. When the transmission is not successful, the IUF is abandoned at step S220.

When it turns out at step S210 that "d_addr" is not registered in the FCT, it is checked at step S215 whether the transmitted frame is a flooding frame.

When it turns out at step S215 that the transmitted frame is a flooding frame, the FCT information is updated at step S216. When the other node transmits "d_ack", the frame is abandoned. When the other node does not transmit the "d_ack", the flooding frame is inserted into the IFQ at step S218.

When it turns out at step S215 that the transmitted frame is not the flooding frame, the FCT information is updated at step S219 and the frame is abandoned at step S220.

The contents of the present invention described above will be described in the entire system as follows.

Types of the data to be transmitted in all nodes are selected among the IUFs or the flooding frames, and transmitted.

When the destination address does not exist in the forwarding table of the corresponding node, the flooding frame is transmitted. Otherwise, the IUF is transmitted.

Each node receiving the frame compares the transmitted frame with its own flooding table and transmits the Ack signal in case that the node itself is the destination. When the node is on the list, the node transmits the "d_ack" signal. Otherwise, the node forwards the flooding frame.

Figure 3:
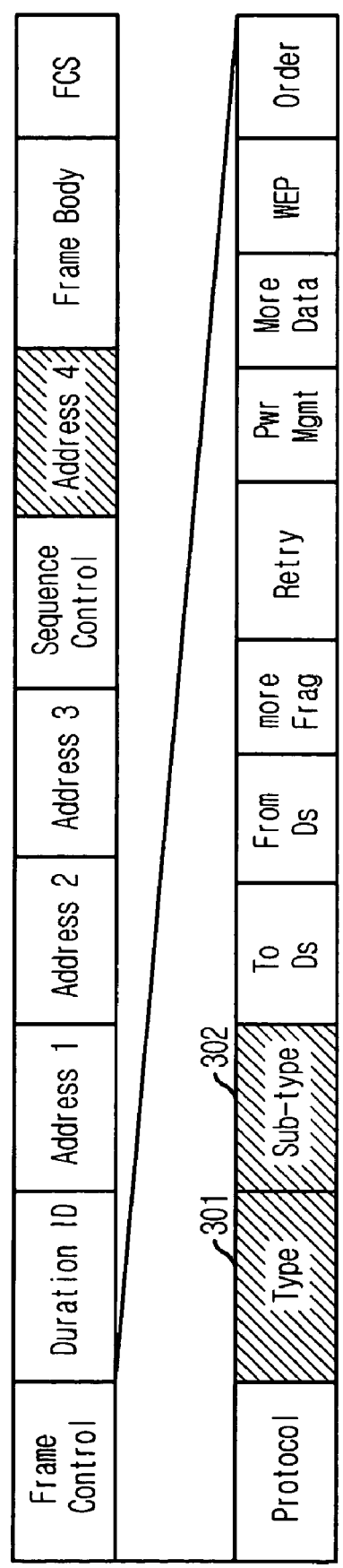
FIG. 3 is a diagram showing a format of a MAC header frame in the MAC forwarding method for multi-hop routing in accordance with the embodiment of the present invention.

FIG. 3 is a diagram showing a format of a MAC header frame in the MAC forwarding method for multi-hop routing in accordance with the embodiment of the present invention.

Newly defined parts are Type and Sub-Type fields. The data type in the Type field is the IUF and the data type in the Sub-Type field is the flooding frame.

Four address fields including a transmitter address, a receiver address, a source address and a destination address are used for MAC forwarding.

The MAC forwarding is performed on the receiver address among the above addresses by constantly using a broadcasting address.

The present invention provides the multi-hop routing method using the forwarding method in the MAC layer for Ad-hoc communication between vehicles, whose vehicle speed and network pattern are frequently changed. Accordingly, the present invention can solve inefficiency caused when the conventional multi-hop routing method is applied to the communication system between vehicles, and provide diverse application services of the communication system between vehicles.

Also, in comparison with the conventional multi-hop routing method, the present invention can save a cost for maintaining the table and makes the multi-hop routing of high speed possible.

As described in detail, the technology of the present invention can be realized as a program and stored in a computer-readable recording medium, such as CD-ROM, RAM, ROM, a floppy disk, a hard disk and a magneto-optical disk. Since the process can be easily implemented by those skilled in the art of the present invention, further description will not be provided herein.

The present application contains subject matter related to Korean patent application Nos. 2005-0110918 and 2006-0001955 filed with the Korean Intellectual Property Office on Nov. 18, 2005, and Jan. 6, 2006, respectively, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A Media Access Control (MAC) forwarding method for multi-hop routing in an ad-hoc communication system between vehicles, comprising the steps of:
 a) in an OSI MAC layer, receiving frames in nodes and checking whether each received frame is a duplicate frame (S201), wherein each of said nodes is located in a vehicle in said ad-hoc communications system, and each of said nodes includes a forwarding cache table (FCT) and a sequence number table (SNT);
 b) updating (S202) information in said FCT when the received frame is a duplicate frame,
 c) when the received frame is not a duplicate frame,
  1) updating (S205) information in said SNT,
  2) checking (S206) whether a destination address of the received frame is the node's own address, and if the destination address is the node's own address,
   i) update the FCT information (S207), transmit an Ack signal (S208) and transfer the frame to a layer above the OSI MAC layer (S209),
   ii) otherwise, update the FCT information (S211, S216, S219) and selectively perform one of:
   insert an implicit unicast frame into an interface queue (S214),
   insert a flooding frame into the interface queue (S218),
   abandon the frame (S220).

2. The method defined claim 1 wherein if the destination address is not the node's own address (S206), and the destination address is registered as a destination address in the FCT information (S210), after said updating of the FCT information (S211), transmit a delay ACK frame (S212), and if successful (S213), perform said inserting the implicit unicast frame into the interface queue (S214), otherwise, perform said abandoning of the frame (S220).

3. The method defined by claim 1 wherein if the destination address is not the node's own address (S206), and the destination address is not registered as a destination address in the FCT information (S210), and, the transmitted frame is a flooding frame (S215), after said updating of the FCT information (S216), if any other node has transmitted a delay ACK frame (S217), perform said abandoning of the frame (S220), otherwise, perform said inserting of the flooding frame into the interface queue (S218).

4. The method defined by claim 1 wherein if the destination address is not the node's own address (S206), and the destination address is not registered as a destination address in the FCT information (S210), and, the transmitted frame is not a flooding frame (S215), after said updating the FCT information (S219) and perform said abandoning of the frame (S220).

* * * * *